(12) United States Patent
Kil

(10) Patent No.: US 7,433,686 B2
(45) Date of Patent: *Oct. 7, 2008

(54) SYSTEM AND METHOD FOR PROVIDING PUBLIC/PRIVATE MOBILE COMMUNICATION SERVICE

(75) Inventor: Tae-Young Kil, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/220,680

(22) Filed: Sep. 8, 2005

(65) Prior Publication Data
US 2006/0019688 A1    Jan. 26, 2006

Related U.S. Application Data

(63) Continuation of application No. 09/755,166, filed on Jan. 8, 2001, now Pat. No. 6,985,723.

(30) Foreign Application Priority Data

May 24, 2000    (KR) ..................... 10-2000-0028172

(51) Int. Cl.
    *H04Q 7/20* (2006.01)
(52) U.S. Cl. .................. 455/426.1; 455/554.1; 455/555
(58) Field of Classification Search ............. 455/426.1, 455/554.1, 554.2, 555, 445, 462, 454.1, 552.1, 455/560, 446, 433, 435.1; 370/392, 401
See application file for complete search history.

(56) References Cited

U.S. PATENT DOCUMENTS

| | | | |
|---|---|---|---|
| 5,303,287 A | 4/1994 | Ladborde | |
| 5,537,610 A | 7/1996 | Mauger et al. | |
| 5,734,699 A * | 3/1998 | Lu et al. | ................... 455/422.1 |
| 5,818,824 A | 10/1998 | Lu et al. | |

(Continued)

FOREIGN PATENT DOCUMENTS

| | | |
|---|---|---|
| KR | 1998-0013028 | 4/1998 |
| KR | 2000-0061038 | 10/2000 |

OTHER PUBLICATIONS

English Tanslation of the Notification of the Reasons for Objection(Korean Office Action) in applicant's corresponding Korean Patent Application No. 10-2000-28172, issued by Korean Intellectual Property Patent Office mailed on Mar. 25, 2002.

*Primary Examiner*—Jean A Gelin
(74) *Attorney, Agent, or Firm*—Robert E. Bushnell, Esq.

(57) ABSTRACT

A method for providing public and private mobile communication service in a mobile communication system. The system constructs a mobile communication network including a private base station transceiver subsystem (Base station Transceiver Subsystem) of a private mobile communication network and a plurality of base station transceiver subsystems of a public mobile communication network, which includes mobile switching centers (MSCs), base station controllers (BSCs) connected to said each mobile switching center, and the base station transceiver subsystems connected to said each base station controller. Upon receipt of a service request from a mobile terminal through at least one of the base station transceiver subsystems including the private base station transceiver subsystem, the system determines whether the requested service is a public mobile communication service or a private mobile communication service; and accesses a network corresponding to the determined one of the public and private mobile communication services, and providing a corresponding mobile communication service to the accessed network.

12 Claims, 7 Drawing Sheets

U.S. PATENT DOCUMENTS

| | | | |
|---|---|---|---|
| 5,887,256 A * | 3/1999 | Lu et al. .................. | 455/426.1 |
| 5,890,064 A | 3/1999 | Widergen et al. | |
| 5,898,931 A * | 4/1999 | I'Anson et al. ............. | 455/560 |
| 5,924,030 A | 7/1999 | Rautiola et al. | |
| 5,940,756 A | 8/1999 | Sibecas et al. | |
| 5,946,627 A * | 8/1999 | Desseignes et al. ......... | 455/465 |
| 5,953,651 A * | 9/1999 | Lu et al. .................... | 455/408 |
| 5,995,839 A * | 11/1999 | Coursey et al. ............. | 455/445 |
| 6,035,193 A * | 3/2000 | Buhrmann et al. ....... | 455/426.1 |
| 6,073,018 A | 6/2000 | Sallberg | |
| 6,073,029 A | 6/2000 | Smith et al. | |
| 6,097,966 A | 8/2000 | Hanley | |
| 6,138,035 A * | 10/2000 | Tsujita .................... | 455/552.1 |
| 6,212,395 B1 * | 4/2001 | Lu et al. .................... | 455/463 |
| 6,526,437 B1 | 2/2003 | Barbey et al. | |
| 6,539,237 B1 | 3/2003 | Sayers et al. | |

* cited by examiner

| MIN | WIRE TERMINAL'S EXTENSION NUMBER | SUBSCRIBER'S NAME |
|---|---|---|
| | | |

FIG. 5

SYSTEM AND METHOD FOR PROVIDING PUBLIC/PRIVATE MOBILE COMMUNICATION SERVICE

CROSS-REFERENCE TO RELATED APPLICATIONS AND CLAIM OF PRIORITY

This application is a Continuation of U.S. patent application Ser. No. 09/755,166 entitled System and Method for Providing Public/Private Mobile Communication Service, filed 8 Jan. 2001 now U.S. Pat. No. 6,985,723. This application makes further reference to, incorporates the same herein, and claims all benefits accruing under 35 U.S.C §119 from an application entitled System and Method for Providing Public/ Private Mobile Communication Service filed in the Korean Industrial Property Office on May 24, 2000, and there duly assigned Serial No. 2000-28172 by that Office.

BACKGROUND OF THE INVENTION

1. Field of the Invention

The present invention relates generally to a mobile communication system, and in particular, to a system which can provide both public and private mobile communication services, and method for providing both public and private mobile communication services.

2. Description of the Related Art

In general, a mobile communication network can be divided into a public mobile communication network and a private (or in-building) mobile communication network, and the two networks cannot interact with each other. That is, the mobile communication system is so designed as to optionally provide either the public mobile communication service or the private mobile communication service, so that the mobile terminal subscriber registered in a specific network can be provided with the service only in the registered network. Therefore, a mobile terminal subscriber registered in the public mobile communication network cannot be provided with the private mobile communication service, and on the contrary, a mobile terminal subscriber registered in the private mobile communication network cannot be provided with the public mobile communication service.

Accordingly, there has been a demand for a method for enabling the mobile terminal subscriber to be provided with both the public and private mobile communication services using one mobile terminal. Incorporated by reference herein are: U.S. Pat. No. 5,303,287 to Enrique Laborde entitled Integrated Personal/Cellular Communications Systems; U.S. Pat. No. 5,537,610 to Ray H. Mauger et al. entitled Mobile Communication Having Mobile Subscribers, PCN Network, PBX and Local Exchange; U.S. Pat. No. 5,890,064 to Ina Widergen et al. entitled Mobile Telecommunications Network Having Integrated Wireless Office System; U.S. Pat. No. 6,073,018 to Krister Sallberg entitled System And Method For Interworking Of Wireless Communication Systems With ISDN Networks; U.S. Pat. No. 6,073,029 to Dennis C. Smith entitled Method And System For Providing Wireless Communications To A Subscriber Of A Private Wireline Network; and U.S. Pat. No. 6,097,966 to Donald V. Hanley entitled Wireless Access For Local Exchange Carriers.

SUMMARY OF THE INVENTION

It is, therefore, an object of the present invention to provide a system and method, which can provide both the public and private mobile communication services.

It is another object of the present invention to provide a system and method, which can provide the public and private mobile communication service and a wire and wireless complex (or unified) communication service.

It is further another object of the present invention to provide a method for enabling a mobile terminal subscriber to be provided with both the public and private mobile communication services using one mobile terminal.

It is yet another object of the present invention to provide a method for performing service registration and location registration in a system which can provide the public and private mobile communication services.

It is still another object of the present invention to provide a public and private mobile communication system in which a wire terminal ring service is simultaneously provided together with a corresponding mobile terminal ring service.

To achieve the above and other objects, there is provided a method for providing public and private mobile communication service in a mobile communication system. The system constructs a mobile communication network including a private BTS (Base station Transceiver Subsystem) of a private mobile communication network and a plurality of base station transceiver subsystems of a public mobile communication network, which includes mobile switching centers (MSCs), base station controllers (BSCs) connected to each mobile switching center, and the base station transceiver subsystems connected to each base station controller. Upon receipt of a service request from a mobile terminal through at least one of the base station transceiver subsystems including the private base station transceiver subsystem, the system determines whether the requested service is a public mobile communication service or a private mobile communication service; and accesses a network corresponding to the determined one of the public and private mobile communication services, and providing a corresponding mobile communication service to the accessed network.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 is a diagram illustrating private mobile communication service registered-subscriber information stored in the database of the private visitor location register shown in FIG. 4;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
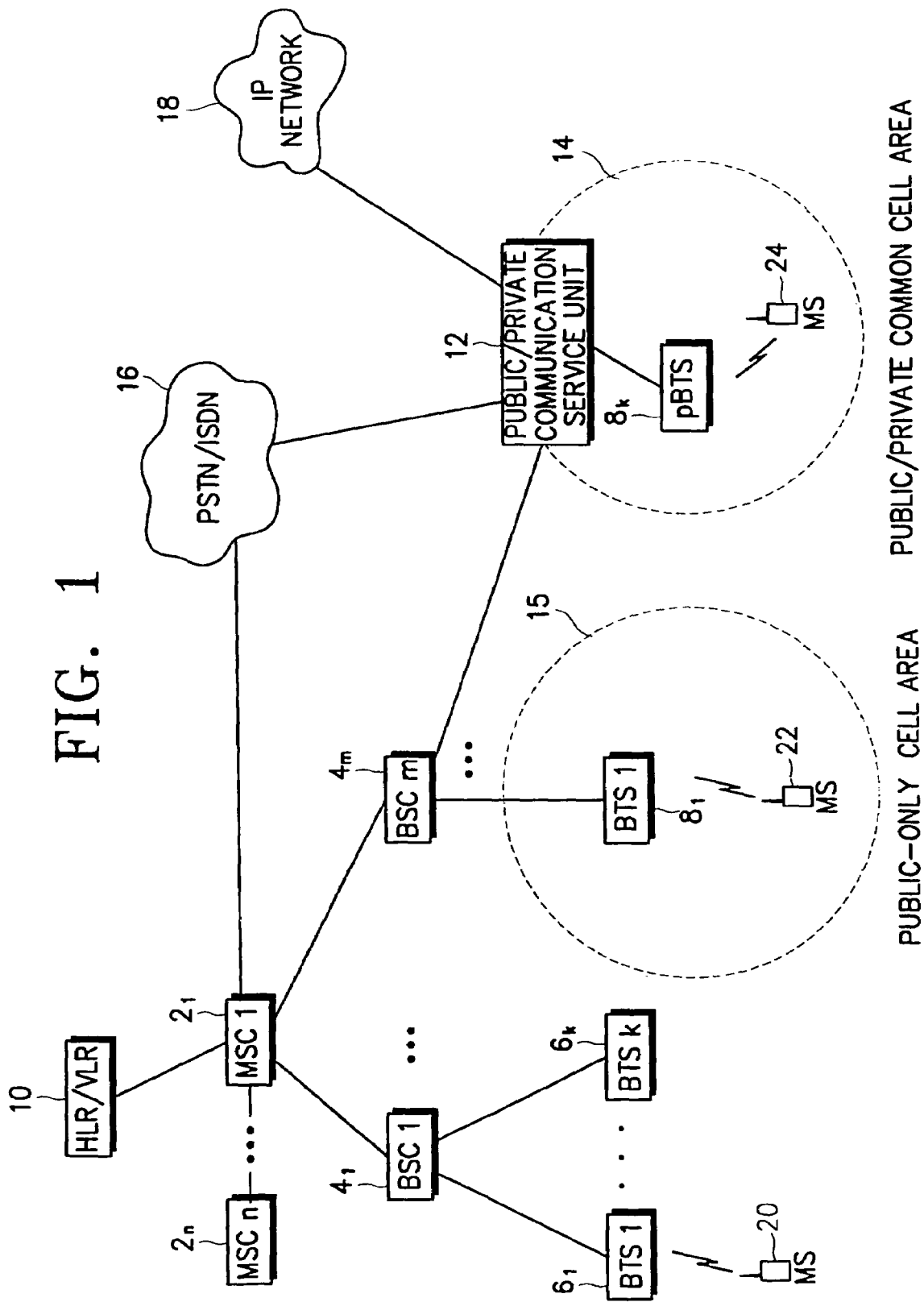
FIG. 1 is a network structure diagram for explaining a concept of a public and private mobile communication service according to an embodiment of the present invention.

FIG. 1 illustrates a network structure for explaining a concept of a public and private mobile communication service according to an embodiment of the present invention. In order to provide both the public and private mobile communication services, an embodiment of the present invention, as shown in FIG. 1, includes a public and private common cell area 14 which is a public and private common communication service area, and a public and private communication service unit 12.

Preferably, the public and private common cell 14 is set to provide a convenience of the communication service to a specific group. For example, when a certain company uses (occupies) one building, the area belonging to the building can be defined as the public and private common cell 14. The public and private common cell 14 is preferably defined by mutual agreement with the public mobile communication service provider.

This is to have a private BTS (Base station Transceiver Subsystem) $8_k$ in the public and private common cell 14 be recognized as a public base station transceiver subsystem from the viewpoint of the public mobile communication system.

In the following description, the private base station transceiver subsystem $8_k$ will be referred to as pBTS, in order to distinguish the private base station transceiver subsystem $8_k$ in the public and private common cell 14 from the base station transceiver subsystems belonging to the public mobile communication system, i.e., the base station transceiver subsystems $6_1$-$6_k$ and $8_l$ shown in FIG. 1.

The pBTS $8_k$, together with a mobile station (MS) 24 in the public and private common cell 14, forms a radio communication path, performs a function of managing the radio resources, and is connected to a BSC (Base Station Controller) $4_m$ of the public mobile communication system through the public and private communication service unit 12. The public and private communication service unit 12 is connected to base station controller $4_m$, PSTN and ISDN (Public Switched Telephone Network and Integrated Services Digital Network) 16, and IP (Internet Protocol) network 18. The public and private communication service unit 12 optionally provides the public mobile communication service and the private mobile communication service to the mobile stations (e.g., the mobile station 24) in the public and private common cell 14.

If the mobile station 24 is registered in the public and private communication service unit 12 to be provided with the private mobile communication service, the mobile station 24 can be provided with not only the public mobile communication service but also the private mobile communication service. However, if the mobile station 24 is not registered in the public and private communication service unit 12 for the private mobile communication service, the mobile station 24 can be provided with only the public mobile communication service. In addition, the public and private communication service unit 12 also performs a wire communication service with the PSTN and ISDN 16 and the IP network 18.

Meanwhile, the public mobile communication network is commonly called a public land mobile network (PLMN) and the private mobile communication network may be known as a personal communication network (PCN) or a private telephony network (PTN). As illustrated in FIG. 1, the public mobile communication system includes a plurality of mobile switching centers (MSCs) $2_1$-$2_n$, a plurality of base station controllers (BSCs) $4_1$-$4_m$, a plurality of base station transceiver subsystems $6_1$-$6_k$ and $8_l$-$8_k$, a plurality of mobile stations (MSs) 20, 22 and 24, and a HLR and VLR (Home Location Register and Visitor Location Register) 10.

Each of the mobile switching centers $2_1$-$2_n$ is connected to its associated base station controllers $4_1$-$4_m$, and each of the base station controllers $4_1$-$4_m$ is connected to its associated base station transceiver subsystems $6_1$-$6_k$ and $8_l$-$8_k$. In particular, the pBTS $8_k$ is one of the base station transceiver subsystems $8_l$-$8_k$ connected to the base station controller $4_m$ of the public mobile communication system according to an embodiment of the present invention.

The mobile switching centers $2_1$-$2_n$ each control the connection between the base station controllers $4_1$-$4_m$ connected thereto and the PSTN and ISDN 16 or another mobile switching center in the public mobile communication network. The base station controllers $4_1$-$4_m$ each perform the radio link control and handoff functions, and the base station transceiver subsystems $6_1$-$6_k$ and $8_l$-$8_k$ perform the functions of forming the radio communication paths to the mobile stations 20, 22 and 24 belonging to their communication service areas, i.e., their cell areas and managing the radio resources.

In the home location register and visitor location register 10, the home location register has a subscriber location registration function and a database function for storing the subscriber information, and the visitor location register has a database function for temporarily storing information about the mobile station existing in the cell managed by a corresponding one of the mobile switching centers $2_1$-$2_n$. If the mobile station moves to a cell managed by another mobile switching center, the corresponding information stored in the visitor location register is deleted.

In the following description, a communication service area for the base station transceiver subsystems $6_1$-$6_k$ and $8_l$ of the public mobile communication system will be called a public-only cell area, in order to distinguish it from the public and private common cell area 14.

For example, in FIG. 1, a communication service area for the base station transceiver subsystem $8_l$ among the base station transceiver subsystems $6_1$-$6_k$ and $8_l$ of the public mobile communication system is defined as a public-only cell area 15. Commonly, the public-only cell area 15 is much wider than the public and private common cell area 14, which is set to provide a convenience of the communication service to a specific group.

Figure 2:
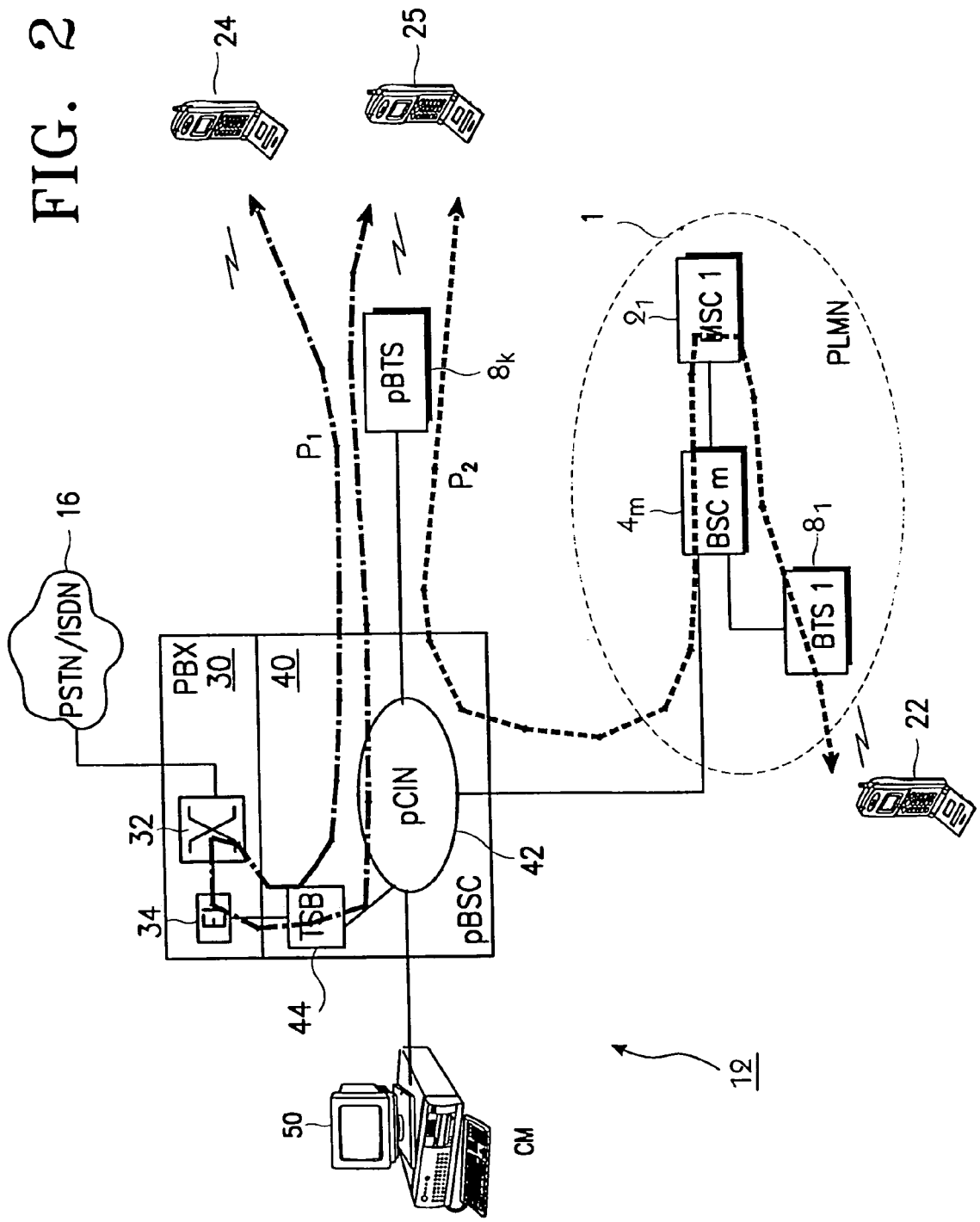
FIG. 2 is a detailed diagram illustrating the public and private communication service unit and the private base station transceiver subsystem of FIG. 1.
Figure 3:
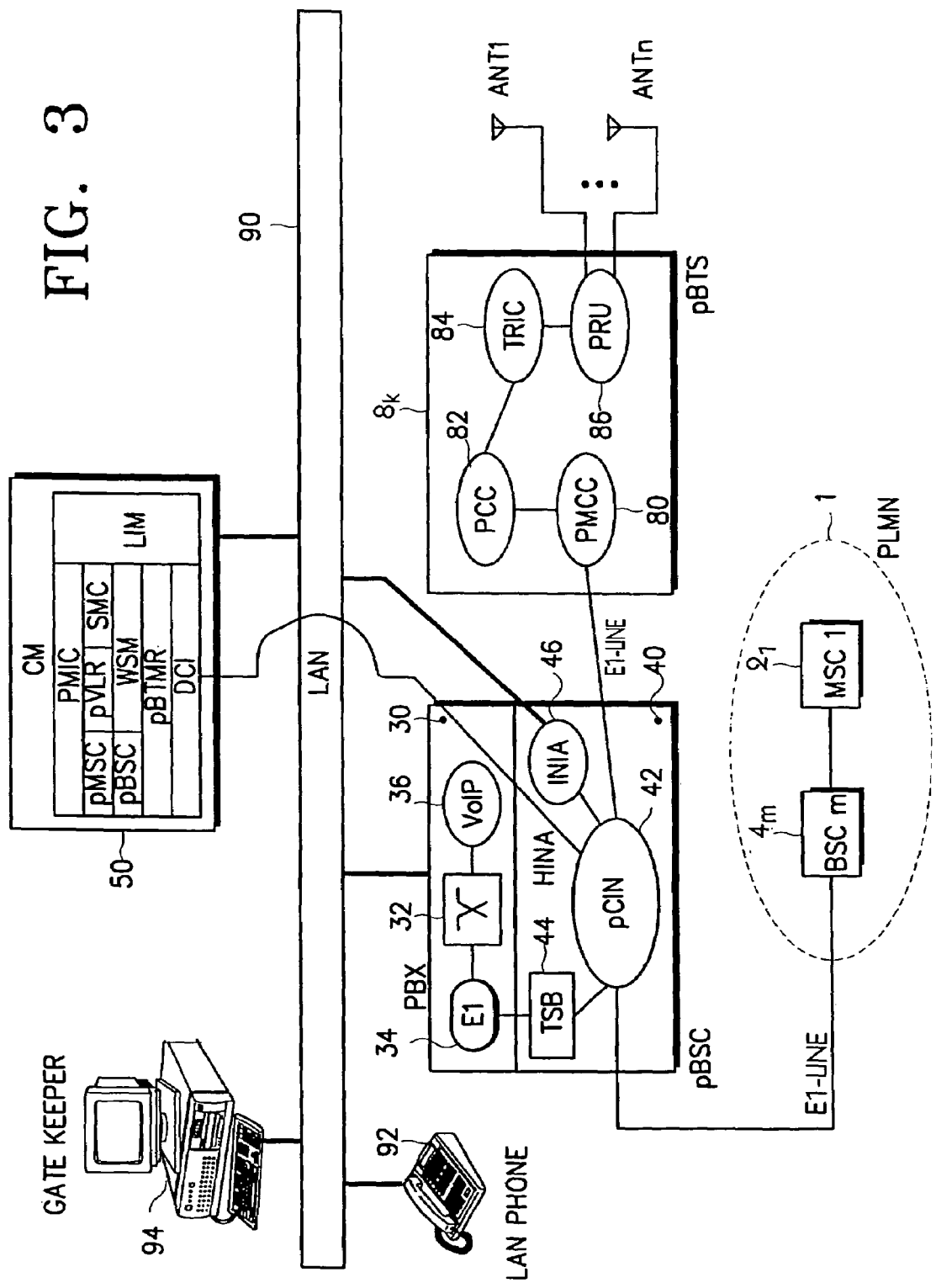
FIG. 3 is a detailed block diagram of FIG. 2.

FIG. 2 illustrates a detailed structure of the public and private communication service unit 12 and the pBTS $8_k$ shown in FIG. 1, and FIG. 3 is a detailed block diagram of FIG. 2. In particular, FIG. 2 is a diagram for showing communication paths formed when the public and private mobile communication services are provided according to an embodiment of the present invention.

Referring first to FIG. 2, the public and private communication service unit 12 of FIG. 1 is comprised of a private branched exchange (PBX) 30, a private base station controller (pBSC) 40, and a call manager (CM) 50. The PBX 30 includes a switch 32 and an E1 interface 34, and the pBSC 40 includes a pCIN (private Communication Interconnection Network) 42 and a TSB (Transcoder & Selector Bank) 44.

It is to be noted that FIG. 2 shows only the elements of the PBX 30 and the pBSC 40 which are required in explaining the communication paths formed when the public and private mobile communication services are provided.

It will be assumed herein that the mobile stations 24 and 25 of FIG. 2 are both located in the public and private common cell area 14 and registered in the public and private communication service unit 12 to be provided with the private mobile communication service, whereas the mobile station 22 is located in the public-only cell area 15.

On the above assumptions, a communication path (i.e., traffic channel) P1 between the mobile station 24 and the mobile station 25, is formed through the pBTS $8_k$, the pCIN 42 in the pBSC 40, the transcoder & selector bank 44, the E1 interface 34, the switch 32, and again through the transcoder & selector bank 44, the pCIN 42, and the pBTS $8_k$. P1 is a communication path formed to provide the private mobile communication service.

Further, a communication path (i.e., traffic channel) P2 between the mobile station 25 and the mobile station 22, is formed through the pBTS $8_k$, the pCIN 42 in the pBSC 40, and the base station controller $4_m$, the mobile switching center $2_l$, and again through the base station controller $4_m$ and then through the base station transceiver subsystem $8_l$ of the PLMN (Public Land Mobile Network) 1. P2 is a communication path formed to provide the public mobile communication service.

Forming such communication paths P1 and P2 for the public and private mobile communication services is performed under the control of the call manager 50 which is a main controller of the public and private communication service unit 12.

The public and private communication service unit 12, according to an embodiment of the present invention, provides a wire service, an IP terminal service, and a public and private mobile communication service. The wire service is performed by the PBX 30 of FIGS. 2 and 3, the inter-IP terminal service (a communication of voice, data, and video information between a LAN phone, a web video phone, a PC, etc.) is performed by a gate keeper 94 of FIG. 3, and the public and private mobile communication service, i.e., a wireless call service, is performed by the call manager 50 of FIGS. 2 and 3.

In FIG. 3, the PBX 30, an INIA (IP Network Interface board Assembly module) 46 of the pBSC 40, and a LIM (LAN Interface Module) of the call manager 50 are connected to a LAN (Local Area Network) 90. The gate keeper 94 is also connected to the LAN 90, and the IP terminals such as a LAN phone 92, a web phone (not shown) and a PC (Personal Computer; not shown) are also connected to the LAN 90.

Figure 4:
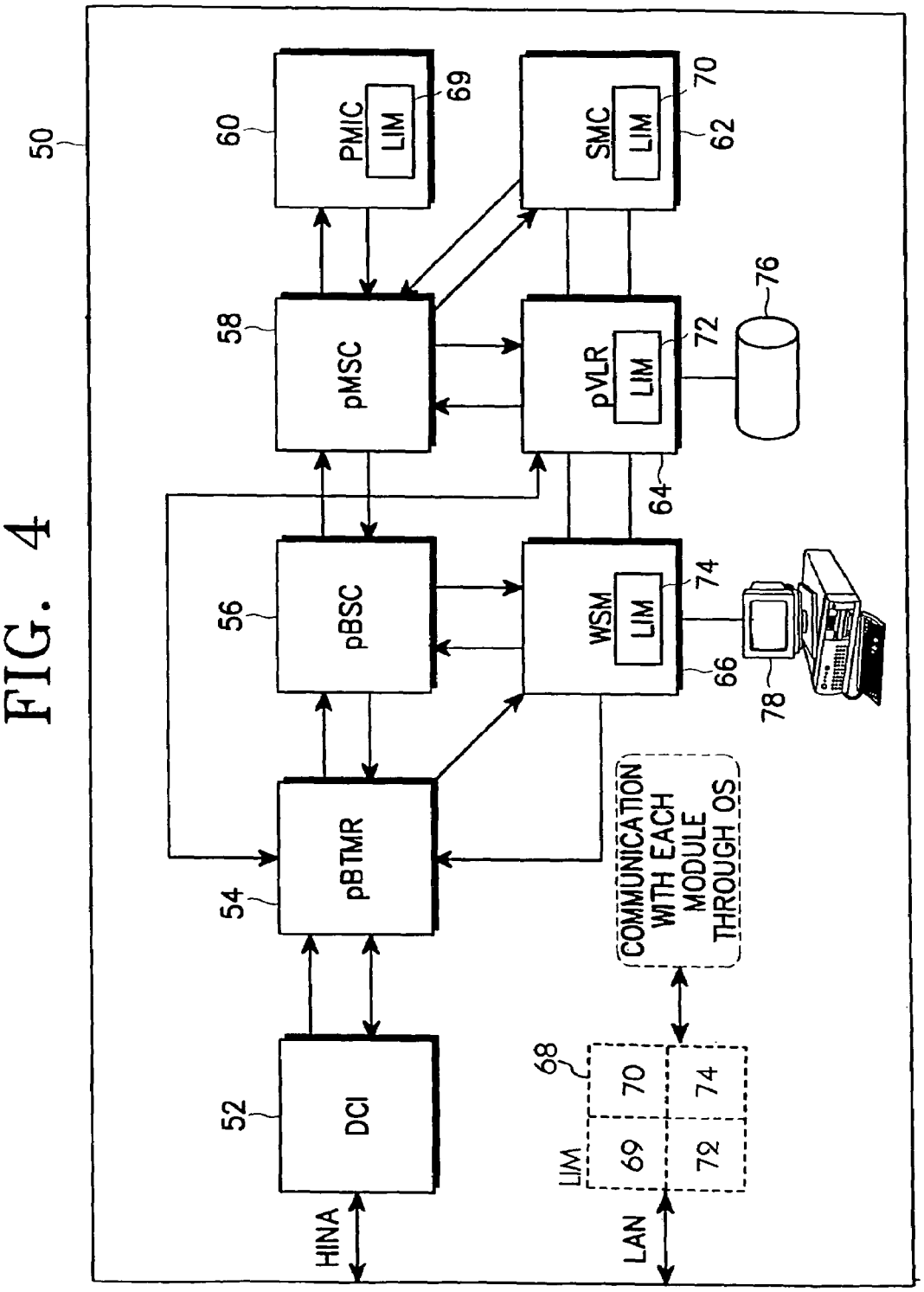
FIG. 4 is a software block diagram of the call manager of FIG. 3.

The pBSC 40, according to an embodiment of the present invention, performs the corresponding functions of the base station controller in the public mobile communication system, i.e., the radio link control and handoff functions. A main controller of the pBSC 40, which will be described later with reference to FIG. 4, is included in the call manager 50 as a software block (which is indicated by a pBSC 56 in the call manager 50 of FIG. 4). The pBSC 40 includes the pCIN (private Communication Interconnection Network) 42. The pCIN 42 provides a communication path to the call manager 50, a communication path to the base station controller $4_m$ of the PLMN 1, a communication path to the pBTS $8_k$, and a data path between respective blocks in the pBSC 40.

That is, the pCIN 42 analyzes a message type and origination addresses and termination addresses included in the received message, and then transmits the analyzed information to the corresponding device or processor. The connection between the pCIN 42 and the base station controller $4_m$ of the PLMN 1 and the connection between the pCIN 42 and the pBTS $8_k$ are implemented by the E1 line.

The TSB (Transcoder & Selector Bank) 44 connected to the pCIN 42 in the pBSC 40 is used to provide the private mobile communication subscriber with the wireless communication service. The TSB 44 has a function for traffic data interfacing between the PBX 30 and the pBSC 40. More specifically, the TSB 44 performs a 2.048 Mbps and 1.544 Mbps non-multiple transmission channel interfacing function, a vocoder function for voice coding and decoding (e.g., PCM (Pulse Code Modulation)←→QCELP (Qualcomm Code Excited Linear Predictive coding)), a soft handoff control and voice selecting function, and a power control function.

The INIA 46 connected to the pCIN 42 in the pBSC 40 controls the wireless in-building data service according to an embodiment of the present invention. The INIA 46 has a function of transmitting to the LAN 90 the packet data received from the mobile station of the public and private common cell area 14, which uses a PPP (Point-to-Point Protocol) server and a TCP/IP (Transmission Control Protocol/Internet Protocol).

A VoIP (Voice over Internet Protocol) block 36, which is located in the PBX 30 of FIG. 3 and connected between the switch 32 and the LAN 90, services the voice over Internet protocol function when the wire terminal (not shown) connected to the PBX 30 is interlinked with the IP terminal such as the LAN phone 92 by the switch 32.

The call manager 50 of FIG. 3 is connected to the pBSC 40 and the LAN 90. The structure and operation of the call manager 50 will be described below in detail. The call manager 50 has the function of controlling a wireless call for the public and private mobile communication services. Here, a call service for the mobile station of the public mobile communication network is controlled such that a message should be bypassed to the public mobile switching center. In addition, the call manager 50 has a function of managing and maintaining the radio resources. However, resource management for the pBTS $8_k$ is controlled by the public mobile switching center $2_l$ and the call manager 50 only consults the resource management.

Further, the call manger 50 has a function of loading a program for a processor for controlling the pBSC resource and loading PLD (Program Loaded Data). However, program loading for the pBTS $8_k$ is managed by a public BSM (Base Station Manager; not shown). In addition, the call manager 50 controls a wire and wireless complex function. Moreover, the call manager 50 supports a wireless in-company short message service (SMS) function, and has an SMS function for that purpose.

In addition, the call manager 50 supports a registration function for a private mobile communication network subscriber and a function setting function, and has a visitor location register management function for roaming the mobile station registered in the private mobile communication network.

In order to perform such functions, the call manager 50, as shown in FIG. 4, includes such software blocks as a DCI (Data Communication Interface) 52, a pBTMR (pBTS Message Router) 54, a pBSC (private Base Station Controller) 56, a pMSC (private Mobile Switching Center) 58, a PMIC (PBX Mobile Interface Controller) 60, an SMC (Short Message service Controller) 62, a pVLR (private visitor location register) 64, a WSM (Wireless System Manager) 66 and a LIM (LAN Interface Module) 68.

In FIG. 4, the DCI 52 is an interface module for interfacing communication between the pCIN 42 in the pBSC 40 and the call manager 50, and manages inter-process communication (IPC) through HINA (High Capability IPC Processor Assembly (FIG. 3)).

The pBTMR 54 is a module for managing path designation over every message to be processed in the pBTS $8_k$. More specifically, the pBTMR 54 designates a signaling message path for public and private call origination and termination services of the mobile station by consulting a router table therein, and designates a message path for a maintenance service of the pBTS $8_k$. In addition, the pBTMR 54 communicates with the pVLR 64.

The pBSC 56 is a main controller of the pBSC 40 shown in FIG. 2 and controls the pBTS $8_k$.

In supporting both the public mobile communication service and the private mobile communication service, the pMSC 58 is interposed between the pBSC 56 and the PMIC 60 to perform a function corresponding to the function performed by the mobile switching center of the existing public mobile communication network. In addition, the pMSC 58 fundamentally processes a subscriber's call, analyzes additional services and performs interfacing for interworking with the PBX 30.

More specifically, the pMSC 58 analyzes the subscriber's service request, works out a fundamental strategy as to whether to process the requested service as the existing public mobile communication network service or the private mobile communication network service, and defines the corresponding procedure.

For interfacing with the pBSC 56, the pMSC 58 follows the procedure of the existing public mobile communication network, and for mutual interfacing, uses the IPC (Inter-Processor Communication).

The PMIC 60 is a module for controlling a wire and wireless complex function. The PMIC 60 is a module, which exists in the public and private common cell area 14, and controls a call among the mobile stations (e.g., mobile station 24 shown in FIGS. 1 and 2) registered for the private mobile communication service, the mobile station 25 shown in FIG. 2, and the wire terminals connected to the PBX 30. Unlike the existing public mobile switching center, the pMSC 58 cannot perform the switching function. Since the pMSC 58 is a software block, it does not have the switch as in the public mobile switching center. Therefore, when providing the private mobile communication service, the public and private communication service unit 12, according to the present invention, uses the switch 32 in the PBX 30.

In the embodiment of the present invention, a module of the PMIC 60 exists between the pMSC 58 and the PBX 30. The PMIC 60 generates a command for controlling the switch 32 in the PBX 30 in response to a switch control request, and applies the generated command to a controller (not shown) of the PBX 30. The controller of the PBX 30 then performs a switch control operation according to the command.

The SMC 62 is a module for managing a short message service (SMS) control function and an SMS web server function.

The pVLR 64 is a module for managing the private mobile communication service-registered subscriber information, the private mobile communication subscribers location registration information, and various functional service information. To the pVLR 64 is connected a database 76 for storing the above information.

The WSM 66 maintains and manages the whole mobile communication service function provided from the public and private communication service unit 12. To the WSM 66 is connected an operator console 78 for interfacing with the operator.

The LIM 68, a module for managing communication with the LAN 90, is comprised of a LIM 69 in the PMIC 60, a LIM 70 in the SMC 62, a LIM 72 in the pVLR 64, and a LIM 74 in the WSM 66. The LIMs 69, 70, 72 and 74 manage communication with their associated modules of the PMIC 60, the SMC 62, the pVLR 64 and the WSM 66, respectively, through the LAN 90 using an operating system (OS).

As described above, in the embodiment of the present invention, the programs (WSM, VLR, SMC, SMS web server, and data service manager), which were conventionally performed by several devices, are performed by one device of the call manager 50. Accordingly, it is possible to increase the system processing efficiency by changing the complicated interfacing to inter-disk message communication under one operation system (OS). The call manager 50 with the software blocks included therein can use the commercial computer as a platform.

Turning back to FIG. 3, the pBTS $8_k$ includes a PMCC (pBTS Main Controller Card) 80, a PCC (pBTS Channel Card) 82, a TRIC (Transmit & Receive Interface Card) 84, and a PRU (pBTS Radio Unit) 86. The pBTS $8_k$ has the structure and operation similar to those of the base station transceiver subsystem in the common public mobile communication system, so that the detailed description will be avoided for simplicity. In the pBTS $8_k$, the PMCC 80, a block for controlling the overall operation of the pBTS $8_k$, processes a call setup and system performance-related signaling message, manages the hardware and software configuration, and allocates necessary resources. The PCC 82 processes a baseband signal defined by the radio specification. The TRIC 84 manages transmit and receive interfacing between the PRU 86 and the PCC 82. The PRU 86, a radio unit, is connected to a plurality of antennas ANT1-ANTn.

The public and private communication service unit 12, according to an embodiment of the present invention, provides the wire service, the IP terminal service, and the public and private mobile communication service. Now, a detailed description will be made of the public and private mobile communication service performed by the public and private communication service unit 12.

The public and private communication service unit 12 provides the mobile stations registered in the call manager 50 with the complex function service associated with the wire functions as well as the wireless functions. The wireless function-related services include a call origination service, a call termination service, a call transfer service, a call forwarding service, a wireless in-building data service, a wireless in-building short message service, a location registration service, etc. Further, the wire and wireless complex function service includes, for example, a function of simultaneously generating a ring (or alert tone) at both the wire terminal and the mobile station, when a call terminates at the wire terminal.

Providing both the public mobile communication service and the private mobile communication service is performed by analyzing every message being applied to the public and private communication service unit 12, transparently transmitting the messages for the public mobile communication network to the public base station controller, and routing the messages for the private mobile communication network to a module in the call manager 50. Such a path designation function is performed by a module of the pBTMR (pBTS Message Router) 54 in the call manager 50. When such events as call origination, call termination, location registration and short message service (SMS) events occur, the pBTMR 54 analyzes the corresponding event message and then designates a path according to the analysis. The pBTMR 54 includes a router table in which designated path information is mapped in association with the respective events, and upon receipt of a message, transmits the received message to the corresponding device and module by consulting the router table.

First, a description will be made of an operation in which the mobile station staying in the public and private common cell area 14 registers for private mobile communication service. When the operator requests registration for private mobile communication service using the operator console 78 shown in FIG. 4, the WSM (Wireless System Manager) 66 displays a service registration input screen on the monitor of the operator console 78. The WSM 66 displays a screen for inputting the private mobile communication service-registered subscriber information such as MIN (Mobile Identification Number) of the mobile station, the wire terminal's extension number and subscriber's name, shown in FIG. 5. When the operator inputs the corresponding information, the WSM 66 stores the input information in the database 76 of the pVLR 64 as shown in FIG. 5.

Figure 6:
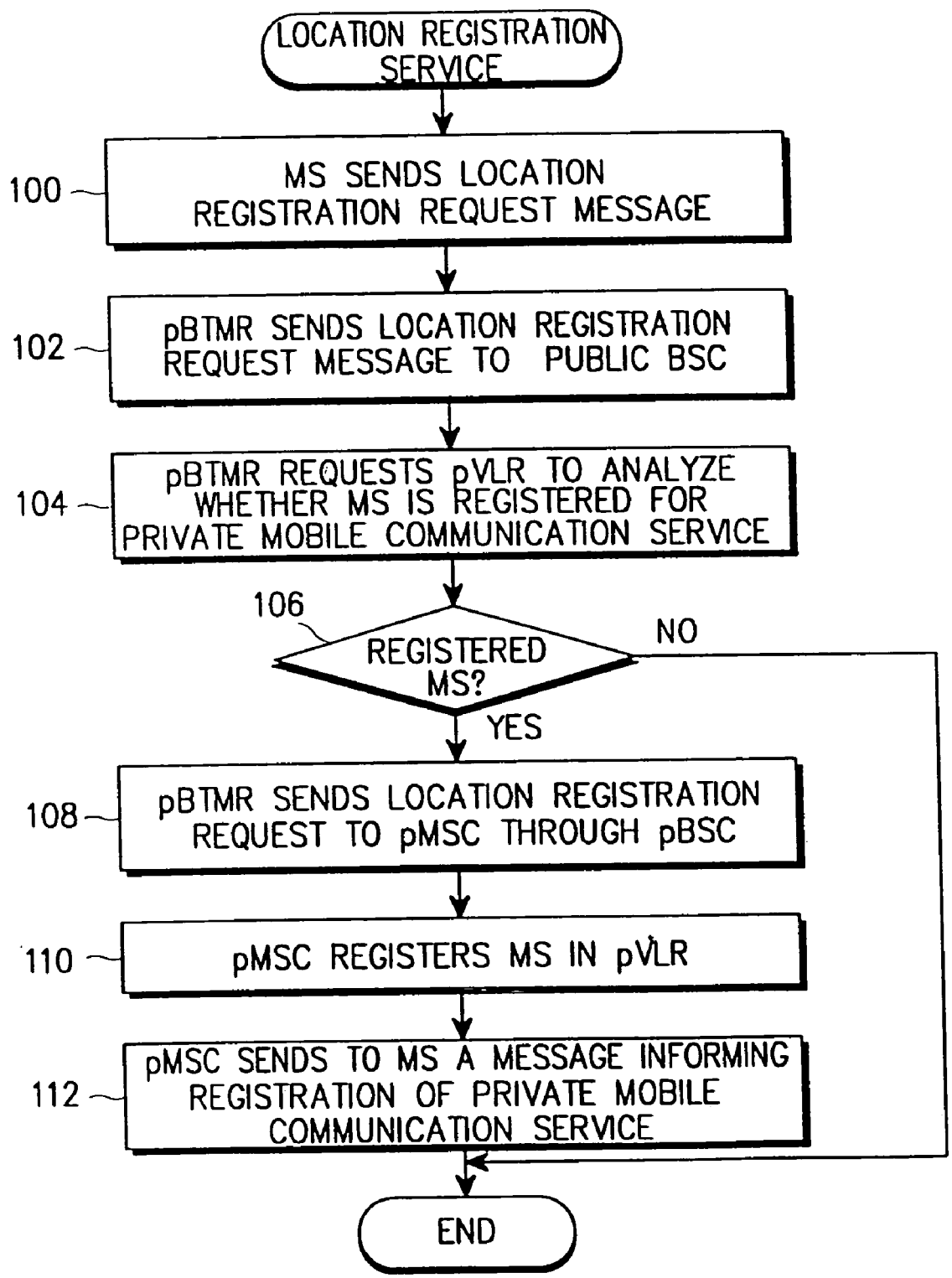
FIG. 6 is a flow chart for explaining a location registration service performed by the public and private communication service unit according to an embodiment of the present invention.

Next, with reference to FIG. 6, a description will be made of a location registration service operation performed by the public and private communication service unit 12 according to an embodiment of the present invention. FIG. 6 is a flow chart for explaining a location registration service performed by the public and private communication service unit 12.

Commonly, the mobile communication system performs the location registration service, when the mobile station is powered ON or OFF, when the mobile station secedes from a zone comprised of one or more cells, when a preset time has elapsed, or when a corresponding command is received from the base station transceiver subsystem.

As an example, when the mobile station in the public and private common cell area 14 sends a location registration request message to the pBTS $8_k$ in step 100 of FIG. 6, the location registration request message from the mobile station is transmitted to the call manager 50 in the public and private communication service unit 12 through the pBTS $8_k$ and the pCIN (private Communication Interconnection Network) 42 in the pBSC 40. The location registration request message received at the call manager 50 is applied to the pBTMR (pBTS Message Router) 54 through the DCI (Data Communication Interface) 52 of the call manager 50.

In step 102, the pBTMR 54 sends the location registration request message to the public base station controller $4_m$, when the event message is the location registration request message. As described previously, the pBTMR 54 includes a router table in which designated path information is mapped in association with the respective events, and upon receipt of a message, transmits the received message to the corresponding device and module by consulting the router table. That is, when it is defined in the router table of the pBTMR 54 that the event message is the location registration request message, the path is designated such that the message should be transmitted to the public base station controller $4_m$. Accordingly, the location registration request message is transmitted to the home location register and visitor location register 10 through the base station controller $4_m$ and the mobile switching center $2_l$ of the public mobile communication network, and then, the public mobile communication system transmits a location registration acknowledge (ACK) message (indicating that the mobile station is registered to access the public mobile communication system) to the public and private communication service unit 12 in response to the location registration request message. The location registration ACK message received at the public and private communication service unit 12 is applied to the pBTMR 54 through the DCI 52.

Upon receipt of the location registration ACK message from the public mobile communication system, the pBTMR 54 requests, in step 104, the pVLR (private visitor location register) 64 to analyze whether the mobile station is registered for the private mobile communication service. Then, in step 106, the pBTMR 54 determines, based on the analysis by pVLR 64, whether the mobile station is registered for the private mobile communication service.

If it is determined in step 106 that the mobile station is registered for the private mobile communication service, the pBTMR 54 proceeds to step 108 where it transmits a location registration request message to the pMSC (private Mobile Switching Center) 58 through the pBSC (private Base Station Controller) 56.

Then, in step 110, the pMSC 58 registers the location of the mobile station, that requested the location registration, in the pVLR 64. Registering location of the mobile station in the pVLR 64 is equivalent to registering the fact that the mobile station, which can receive the private mobile communication service, exists in the public and private common cell area 14.

After location registration in the pVLR 64, the pMSC 58 transmits, in step 112, to the mobile station, that requested the location registration, a message informing the mobile station that it is registered for the private mobile communication service in the public and private common cell area 14. The above message is transmitted to the mobile station, that requested the location registration, through the pMSC 58, the pBSC 56, the pBTMR 54, the DCI 52, the pCIN 42 in the pBSC 40, and the pBTS $8_k$. As a result, the mobile station user perceives that his mobile station is in the public and private common cell area 14 so that he can be provided with the private mobile communication service as well as the public mobile communication service.

An advantage of the private mobile communication service is that it is possible to perform the wireless in-building communication without a separate mobile station, i.e., by using the mobile station used in the public mobile communication network. Another advantage is that a call between the mobile stations in the specified area (e.g., the public and private common cell area 14) is made free of charge, since the communication path for the private mobile communication service is formed within the public and private communication service unit 12.

Should step 106 determine that the mobile station in the public and private common cell area 14 is not registered in the pVLR 64 for the private mobile communication service, the location registration service ends and the mobile station is able to receive only the public mobile communication service. That is, the mobile station in the public and private common cell area 14 can receive the public mobile communication service, since it is registered in the home location register and visitor location register 10 of the public mobile communication system, though not registered in the pVLR 64 for the private mobile communication service.

Meanwhile, the public and private communication service unit 12 should determine, when the mobile station user now located in the public and private common cell area 14 originates a call, whether the mobile station user desires to be provided with the private mobile communication service or the public mobile communication service. To this end, when the user desires to be provided with the private mobile communication service, the mobile station user adds preset identification information for service identification to the originating number (i.e., a phone number of the called party), and the public and private communication service unit 12 determines whether an origination call requests the public mobile communication service or the private mobile communication service, depending on the identification information.

In addition, upon receipt of a telephone call, the public and private communication service unit 12 determines whether the telephone call is a call for the public mobile communication service or a call for the private mobile communication service. If the telephone call is a call for the public mobile communication service, the public and private communication service unit 12 transparently bypasses the telephone call to the pBTS $8_k$. Otherwise, if the telephone call is a call for the private mobile communication service, the public and private communication service unit 12 provides the private mobile communication service.

Figure 7:
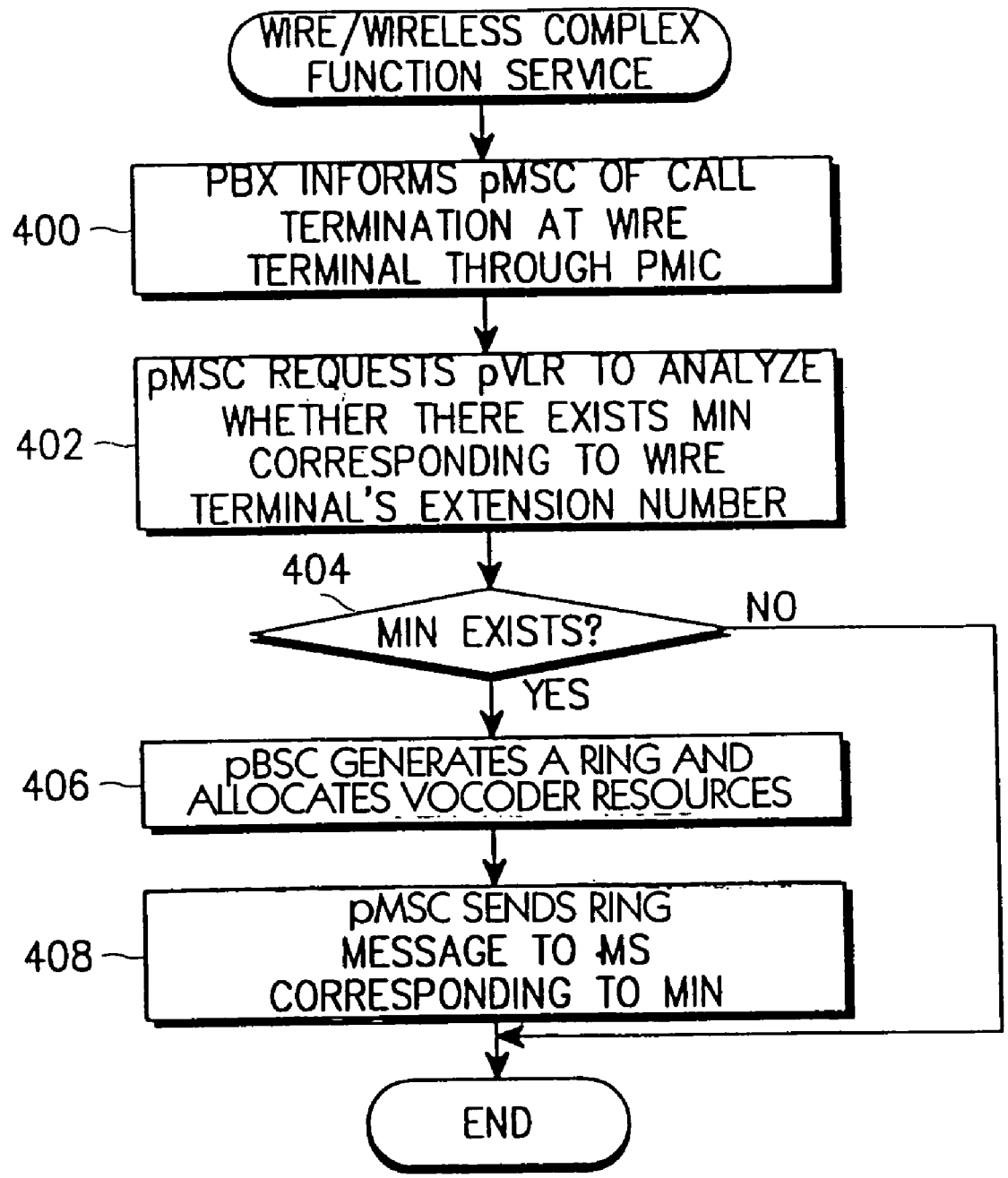
FIG. 7 is a flow chart for explaining a wire and wireless complex function service performed by the public and private communication service unit according to an embodiment of the present invention.

Finally, with reference to FIG. 7, a description will be made of a wire and wireless complex function service performed by the public and private communication service unit 12, wherein a ring is simultaneously generated at both the wire terminal and the mobile station, when a call terminates at the wire terminal. FIG. 7 is a flow chart for explaining the wire and wireless complex function service performed by the public and private communication service unit 12 according to an embodiment of the present invention.

In order to perform the operation of simultaneously generating the ring both at the wire terminal and the mobile station when the call terminates at the wire terminal, the wire terminal's extension number and the MIN (Mobile Identification Number) of the private mobile communication service-registered mobile station should be registered in the pVLR as shown in FIG. 5. If a call terminates at a wire extension terminal connected to the PBX 30, then the PBX 30 informs the pMSC 58 of the call termination at the wire terminal through the LAN 90 and the PMIC (PBX Mobile Interface Controller) 60 in the call manager 50, in step 400 of FIG. 7. Then, in step 402, the pMSC 58 requests the pVLR 64 to analyze whether there exists the MIN corresponding to the wire terminal's extension number.

Upon receiving the analysis results from the pVLR 64, the pMSC 58 determines, in step 404, whether the pVLR 64 includes the MIN corresponding to the wire terminal's extension number. If not the process ends.

If the MIN corresponding to the wire terminal's extension number exists, the pMSC 58 requests the pBSC 56 to generate a ring. At the request of the pMSC 58, the pBSC 56 allocates a vocoder resource of the transcoder & selector bank (TSB) 44 in step 406. The TSB 44 includes a plurality of vocoder channels, and the pBSC 56 allocates an unused one of the vocoder channels and then allocates a processor having a vocoder function for the vocoder channel. When the pBSC 56 allocates the vocoder resource, the pMSC 58 transmits, in step 408, a ring message (or alert message) to the mobile station corresponding to the MIN. Accordingly, the ring is provided to the corresponding mobile station. As a result, the ring is provided to the corresponding mobile station as well as the wire terminal. In the meantime, when the user answers the telephone call using the wire terminal or the mobile station, a call is setup to the origination party.

As described above, it is possible to provide the mobile terminal subscriber with the public mobile communication service as well as the private mobile communication service by using the private base station transceiver subsystem in the public and private common cell area.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile communication system including a plurality of mobile stations (MSs), at least one mobile switching center (MSC), a plurality of public mobile communication network's base station controllers (BSCs) each connected to the MSC, and a plurality of public mobile communication network's base station transceiver subsystems (BTSs) connected to each of the base station controllers (BSCs), for forming a public-only cell area, the system comprising:
   a public/private communication service unit, providing a call or data service, connected to a particular one of the plurality of public mobile communication network's base station controllers (BSCs); and
   at least one private base station transceiver (pBTS) connected to the public/private communication service unit, for forming a public/private common cell area;
   wherein if a message received for a service requested by a particular one of the mobile stations (MSs) is a public mobile communication service message, the public/private communication service unit transparently transmits the received message, and if the received message is a private mobile communication service message, the public/private communication service unit provides network access for a corresponding private mobile communication service; and
   wherein said public/private communication service unit is directly connected between said particular one of the plurality of public mobile communication network's base station controllers (BSCs) and said at least one private base station transceiver (pBTS).

2. The apparatus as set forth in claim 1, wherein the public/private communication service unit comprises:
   a network access controller for determining whether a message received for a service requested by a particular one of the mobile stations (MSs) is a public mobile communication service message or a private mobile communication service message, and providing network access according to the determination result; and
   a communication path former for forming a communication path for a corresponding service under the control of the network access controller.

3. The apparatus as set forth in claim 2, wherein the communication path former comprises:
   a private branched exchange (PBX);
   a traffic data interface for performing traffic data interfacing between the private branched exchange (PBX) and the private base station transceiver (pBTS); and
   a communication network connector connected to the traffic data interface, the network access controller, the private base station transceiver (pBTS), and a particular one of the public mobile communication network's base station transceiver subsystems (BTSs), for analyzing an address of a received message and providing a data path and a communication path so that the received message can be transmitted to a node of the corresponding address.

4. The apparatus as set forth in claim 3, wherein the traffic data interface comprises:
   a private base station controller (pBSC) forming a communication path between the private base station transceiver (pBTS) and the particular one of said plurality of public mobile communication network's base station controllers (BSCs), and
   a transcoder and selector bank (TSB) for performing traffic data interfacing between the private branched exchange (PBX) 30 and the private base station controller (BSC).

5. The apparatus as set forth in claim 2, wherein the network access controller comprises:
   a main controller for controlling the private base station transceiver (pBTS) for the public/private mobile communication service and controlling the network access according to the public/private mobile communication service;

a private location register in communication with the main controller, for managing private mobile communication service-registered subscriber information and location registration information of a private mobile communication subscriber; and a message router with a routing table to which path information corresponding to each of received messages is mapped, for designating a path of a received message by consulting the routing table.

6. The apparatus as set forth in claim 5, wherein the network access controller further comprises a manager for maintaining and managing a mobile communication service function provided by the public/private communication service unit.

7. The apparatus as set forth in claim 5, wherein the network access controller further comprises a wire/wireless interface controller for interfacing with a wire private branched exchange (PBX) and a mobile terminal registered for the private mobile communication service.

8. The apparatus as set forth in claim 5, wherein the network access controller further comprises a short message service (SMS) controller for controlling a short message service for a mobile terminal registered for the private mobile communication service.

9. The apparatus as set forth in claim 2, further comprising an IP Network Interface Board Assembly Module (INIA) for providing a particular one of the plurality of mobile stations (MSs) connected to a Local Area Network with a wireless in-building data service.

10. The apparatus as set forth in claim 1, wherein the communication service unit is connected to a public switched telephone network (PSTN), an integrated services digital network (ISDN), or an Internet protocol (IP) network.

11. The apparatus as set forth in claim 10, said public and private communication service unit comprising:

a call manager operating as a main controller of the public/private communication service unit;

a private branch exchange (PBX) connected to said public switched telephone network (PSTN) and said integrated services digital network (ISDN); and a private base station controller (pBSC) for communicating with said particular one of the mobile stations (MSs) within said public/private common cell area, said particular one of the plurality of public mobile communication network's public base station controllers (BSCs), said call manager and said private branch exchange (PBX).

12. The apparatus as set forth in claim 11, said private base station controller (pBSC) comprising:

a private communication interconnection network for analyzing a message type and origination addresses and termination addresses included in a received message, and then transmitting analyzed information via a communication path to one of said private base station transceiver (pBTS), said particular one of the plurality of public mobile communication network's public base station controllers (BSCs), said call manager and said private branch exchange (PBX); and a transcoder and selector bank for traffic data interfacing between said private branch exchange (PBX) and said private base station controller (pBSC).

* * * * *